United States Patent [19]

Gehrke et al.

[11] Patent Number: 5,011,719
[45] Date of Patent: Apr. 30, 1991

[54] POLYMERIC COMPOSITIONS AND FILMS

[75] Inventors: Russell P. Gehrke, Neenah; Richard E. Johnson, Jr., Appleton; Yong J. Kim, Neenah, all of Wis.

[73] Assignee: American National Can Company, Chicago, Ill.

[21] Appl. No.: 78,122

[22] Filed: Jul. 27, 1987

Related U.S. Application Data

[63] Continuation-in-part of Ser. No. 802,910, Nov. 29, 1985, Pat. No. 4,764,404.

[51] Int. Cl.$^5$ .............................................. B29D 22/00
[52] U.S. Cl. ........................... 428/35.7; 428/212; 428/349; 428/516; 428/517; 428/521
[58] Field of Search ............... 428/349, 212, 35.7, 428/516, 517, 521

[56] References Cited

U.S. PATENT DOCUMENTS

| Re. 28,688 | 1/1976 | Cook | 260/3 |
|---|---|---|---|
| 3,299,174 | 1/1967 | Kuhre | 525/240 |
| 3,572,721 | 3/1971 | Harrison | 260/876 |
| 3,665,059 | 5/1972 | Mahlman | 260/897 A |
| 3,701,702 | 10/1972 | Schichman | 525/201 |
| 3,758,643 | 9/1973 | Fischer | 260/897 A |
| 3,793,283 | 2/1974 | Frailey | 260/33.6 A |
| 3,806,558 | 4/1974 | Fischer | 260/897 A |
| 3,850,474 | 11/1974 | Welch | 296/31 P |
| 3,937,758 | 2/1976 | Castagna | 260/876 B |
| 3,952,073 | 4/1976 | Isaka | 264/289 |
| 4,104,210 | 8/1978 | Coran | 260/889 |
| 4,125,662 | 11/1978 | Weiner | 428/516 |
| 4,140,162 | 2/1979 | Gajewski | 525/95 |
| 4,147,827 | 4/1979 | Briedt | 428/21 Y |
| 4,169,910 | 10/1979 | Graboski | 428/35 |
| 4,210,686 | 7/1980 | Gajewski | 428/35 |
| 4,250,273 | 2/1981 | Bohm | 428/21 Y |
| 4,291,092 | 9/1981 | Weiner | 428/349 |
| 4,311,742 | 1/1982 | Otsuka | 428/35 |
| 4,311,807 | 2/1982 | McCullough, Jr. | 264/22 |
| 4,322,465 | 3/1982 | Webster | 428/194 |
| 4,336,212 | 6/1982 | Yoshimura | 264/22 |
| 4,350,795 | 9/1982 | Bohm | 525/195 |
| 4,352,849 | 10/1982 | Mueller | 428/213 |
| 4,357,376 | 11/1982 | Nattinger | 428/216 |
| 4,391,862 | 7/1983 | Bornstein | 428/518 |
| 4,405,667 | 9/1983 | Christensen | 524/565 |
| 4,407,877 | 10/1983 | Rasmussen | 428/105 |
| 4,440,815 | 4/1984 | Zomorodi | 524/505 |
| 4,448,792 | 5/1984 | Schirmer | 428/516 |
| 4,479,989 | 10/1984 | Mahal | 428/35 |
| 4,528,220 | 7/1985 | Hwo | 428/35 |
| 4,568,723 | 2/1986 | Lu | 525/95 |
| 4,621,119 | 11/1986 | Lu | 525/240 |
| 4,634,735 | 1/1987 | Thiersault et al. | 525/88 |
| 4,643,926 | 2/1987 | Mueller | 428/516 |
| 4,734,459 | 3/1988 | Cecchin et al. | 525/247 |
| 4,769,261 | 9/1988 | Hazelton | 428/35 |
| 4,772,497 | 9/1988 | Maasola | 428/35 |

FOREIGN PATENT DOCUMENTS

| 0165791 | 12/1985 | European Pat. Off. |
| 2072744 | 6/1977 | Japan . |
| 4103478 | 8/1979 | Japan . |
| 58-101135A | 6/1983 | Japan . |
| 58-157839 | 9/1983 | Japan . |

OTHER PUBLICATIONS

Manufacturer's (Shell Chemical Company) literature, undated, regarding Kraton ® polymers, which include SEBS.

*Primary Examiner*—Edith Buffalow
*Attorney, Agent, or Firm*—Robert A. Stenzel; Paul R. Audet

[57] ABSTRACT

Multiple layer films, and novel polymer compositions, for use in packaging sterile medical products and shelf stable foods. The films include at least two layers of modified polypropylene-based compositions, and optionally a third layer of polypropylene-based composition. The two layers of the film comprise polypropylene polymers having melting point temperatures, differing by at least 3° C., with corresponding ethylene contents disparate by at least 1 weight percent ethylene. In 2-layer films, the compositions include ethylene butene-1 copolymer in both layers, and optionally an elastomer in either or both layers. Three and four layer films are set forth wherein outer polypropylene based layers protect the inner layers, as of the two layer composition, from bonding to corresponding portions of adjacent like layers. The films can be fabricated into packages formed as by heat sealing.

82 Claims, 3 Drawing Sheets

POLYMERIC COMPOSITIONS AND FILMS

BACKGROUND OF THE INVENTION

The packaging industry makes and uses many sheet structures in the making of heat sealed packages. Such packages find use in a multiplicity of applications. Of particular interest to the invention are those applications where the finished package may be subjected to relatively abusive shocks, as by being dropped, bumped, repeatedly flexed, or the like. In cases where the package is holding fluid contents, the shock may be transferred to all parts of the package by the contained fluid. The transferred shock is effective to cause failure of the package at its weakest point when the severity of the shock is sufficiently great.

Failures in heat sealed packages tend to occur at or close to a heat seal. Some failures occur by partial peeling of the facing sealant layers from each other in the seal area. Where the shock is severe enough, the package may have a catastrophic failure wherein the package may be penetrated to the outside. Such penetration resulting from shock abuse typically occurs at or near the seals. Such failure of the package, whether by partial peeling or by catastrophic failure, compromises the containment and protective functions of the package, and is thus not acceptable.

It is desirable to find material compositions which may be used in packaging sheet structures which compositions enhance the capability of the sheet structure, and particularly the sealant layer to withstand increased amounts of shock-type abuse, while providing the capability in the outer surface of the package to tolerate direct contact with other packages, at conditions normally anticipated to be encountered over the life of the package, without the packages sticking to each other. These specific capabilities are functionally effective only to the extent they are combined into a package which otherwise exhibits capabilities compatible with the instant requirements.

In certain packaging applications, the packages are subjected to heat treatment, such as with steam or hot water, at elevated temperatures of about 121° C. as part of the packaging process. Such heat treatments, commonly known as retort processing, are common in certain packaging of medical supplies and shelf stable foods.

Polypropylene polymers, which are otherwise excellent for use with high temperature applications, tend to become more brittle after being subjected to such processes, especially those processes in which it is subjected to steam or hot water. Increasing brittleness leads to less ability to resist shock-type abuse. While the use of such materials is desirable for their ability to withstand heat treatment without failure of the package during the heat treatment, the resulting brittleness is an undesirable feature, as it affects the ability of the package to withstand the shocks of, for example, shipping and handling.

There is also concern that the package may be subjected to repeated flexing during its life cycle. While polypropylene is desirably tolerant of the high temperatures used for processing medical supplies and shelf stable foods, after having been subjected to such high temperature retort processing, it tends to be less resistant to cracking under the repeated flexure. In some cases, the cracks are seen as a direct result of repeated flexing. In other cases the cracking may be exhibited as a result of shock-type physical abuse. Exemplary of such abuse are jiggling, repeated bumping, and high impact dropping.

The susceptibility of the overall package to failure as a result of cracking is a property which is a composite of, at least, the tendency of the individual layers to crack, the interfacial bond strengths, the elasticity of the adjacent layers and their capability to absorb and dissipate physical shock, the thickness of individual layers, and, to a degree, any overwhelming tendency of any one layer to crack. This tendency toward cracking is sometimes designated as brittleness.

The composite evaluation of the ability of retort processed packages to tolerate abuse is usually observed as the fraction of the filled and sealed packages which fail after being subjected to some physical stress or shock.

While polypropylene has been accepted as the material of choice for use in sealant layers of retortable pouches in many instances, it has been selected more or less by necessity, as few other materials in the same price range can provide similar high temperature processability. Likewise certain polypropylenes are among the few materials which are approved for contact with food and medical solutions. Thus, polypropylene provides a combination of desirable properties of tolerance of high temperature and approval for food contact, at a modes cost.

The shelf life of medical solutions and shelf stable foods is influenced, in part, by the stability of the moisture content of the contained product. Thus the ability of the package to retard, or prevent, transmission of moisture vapor through the packaging material may have a direct influence on the length of the shelf life of the contained product.

Polypropylene provides a good barrier to transmission of moisture vapor.

It is an object of this invention to provide a multiple layer polymeric film suitable for use in forming a package for shelf stable foods and medical solutions. both of which may be subjected to retort processing at elevated temperatures of, for example, about 121° C.

It is a further objective to provide such packages which have improved capability to tolerate flexing and other stress crack inducing activities.

It is a further object of this invention to provide multiple layer films incorporating therein novel compositions; and packages made from those films.

It is yet another object to provide packages made from the novel films herein, which particularly have been retort processed at temperatures of about 121° C., and for about 30 minutes of processing at that temperature.

SUMMARY OF THE DISCLOSURE

One definition of the invention is in a composition of matter which is a blend of a polypropylene polymer, an ethylene butene-1 copolymer containing 85 to 95 mole percent ethylene, and a styrene ethylene butylene styrene copolymer (SEBS). The polypropylene is present in an amount of 35% to 80%, preferably 40% to 75%, most preferably about 45% to about 55% by weight. The ethylene butene-1 copolymer is about 5% to 50%, preferably 20% to 40%, most preferably about 30% to about 40% by weight of the composition. The ratio of the amount of SEBS in the composition to the amount of ethylene butene-1 copolymer is preferably about 0.2/1 to about 0.8/1, most preferably 0.4/1 to 0.6/1.

Another definition of the invention is embodied in a multiple layer film having first and second layers. The composition of the first layer is a blend of polypropylene, with two other components. The polypropylene, which is present as 40% to 80% by weight of the first layer, is a copolymer containing 1 to 8 weight percent random moieties of ethylene. The second component of the blend composition of the first layer is 5% to 50% by weight of an ethylene butene-1 copolymer containing 85 to 95 mole percent ethylene. The third component of the blend composition of the first layer provides elastomeric properties and is selected from the group consisting of ethylene propylene copolymer, polybutylene, polyisobutylene, ethylene propylene diene monomer terpolymer, styrene butadiene styrene copolymer, styrene ethylene butylene styrene copolymer, styrene isoprene styrene copolymer, polybutene-1, and isobutylene isoprene copolymer.

The composition of the second layer is a blend of, as a first component, a second polypropylene polymer containing up to 7 weight percent random moieties of ethylene; and, as a second component, 5% to 50% by weight of an ethylene butene-1 copolymer containing 85 to 95 mole percent ethylene. The second component may be the same copolymer as the second component in the first layer.

With respect to the two layer film, the random moiety ethylene content in the second polypropylene in the second layer is at least 1 weight percent, preferably at least 1.5 percent, less than the random moiety ethylene content in the polypropylene in the first layer.

Wherever ethylene content is referred to herein as a component of a propylene polymer, the numerical recitations refer only to the random ethylene content, and have no relevance to any ethylene block units which may exist in the polymer composition. The random ethylene content is recited as a general indicator of the melting point temperature of the polymer; and so long as the same test procedure is used, a polypropylene having a lower ethylene content generally has a higher melting point temperature.

In preferred embodiments of the 2-layer structure, the composition of the second layer comprises 50% to 80% of the second polypropylene and 50% to 20% of the ethylene butene-1 copolymer. The first layer comprises 40% to 60% of the first polypropylene, 30% to 40% of the ethylene butene-1 copolymer, and 10% to 20% of styrene ethylene butylene styrene copolymer (SEBS) as the third elastomeric component.

With respect to the layer thicknesses, the second layer preferably comprises 25% to 75% of the thickness of the film, the first layer conversely comprising 75% to 25% of the thickness of the film.

More preferred embodiments of the film include a third layer, with the second layer being between the first and third layers. The composition of the third layer is, as a first component, a third polypropylene polymer containing up to 7 weight percent random moieties of ethylene and having a melting temperature greater than the retort processing temperature to which the film is expected to be exposed. A second component is up to 25% by weight of an ethylene butene-1 copolymer containing 85 to 95 mole percent ethylene, as used in the first and second layers. It is preferred, in some embodiments of the three layer film that the first layer comprises 50% to 70% of the thickness of the film, the second layer comprise 25% to 35% of the thickness of the film, and the third layer comprise 5% to 15% of the thickness of the film.

In another family of three layer films related to the previously described film, the first layer is a blend of three components. The first component is a first polypropylene, as a copolymer containing 1 to 8 weight percent random moieties of ethylene. The second component is 5% to 50% by weight of the above recited ethylene butene-1 copolymer. The third component provides elastomeric properties and is selected from the group of elastomers recited above for the third component of the first layer in the two layer film. The third component of the first layer is preferably SEBS.

The second layer is a blend of a second polypropylene polymer containing up to 7 weight percent random moieties of ethylene, and up to 25% by weight of the above recited ethylene butene-1 copolymer.

The composition of the third layer of the film comprises a third polypropylene, as a copolymer containing 1 to 8 weight percent random moieties of ethylene. The third layer optionally comprises up to 30% of the ethylene butene-1 copolymer, and as a separate option, up to 20% SEBS.

In this embodiment, the first layer is between the second and the third layers. It is preferred that the third layer comprise 5% to 20%, preferably about 10% of the thickness of the film.

All the layers of the film are generally held together with adhesion. In general the random moiety ethylene content in the polypropylene in the second layer is at least 1 weight percent, preferably about 1.5 percent, less than the random moiety ethylene content in the polypropylene in at least one of the first and third layers.

The third layer may contain up to about 20% by weight of the ethylene butene-1 copolymer in a two component composition. To the extent the composition of the third layer comprises greater than about 20% ethylene butene-1 copolymer, as the second component, then it is preferable to include, as a third component, up to about 20% SEBS, with the preferred ratio of SEBS to ethylene butene-1 being in the range of 0.2/1 to 0.8/1, most preferably 0.4/1 to 0.6/1. For use in some embodiments, it is entirely acceptable to use as the third component of the third layer others of the elastomers recited for the third component of the second layer in the two layer film. Preferred elastomers have terminal styrene block moieties.

Referring now specifically to highly preferred embodiments, the first layer is a blend containing, as a first component, 40% to 60% by weight of a first polypropylene, as a copolymer containing 5% to 7% ethylene. The composition of the first layer further comprises, as a second component, 30% to 40% by weight of an ethylene butene-1 copolymer containing 85 to 95 mole percent ethylene. The third component, which comprises 10% to 20% by weight of the first layer, is an SEBS copolymer. The first layer comprises 50% to 70% of the thickness of the film.

The composition of the second layer, which is adapted for forming the outer layer in a package structure, comprises 80% to 90% by weight of a second polypropylene polymer containing 3 to 5 weight percent ethylene and 20% to 10% by weight of an ehtylene butene-1 copolymer containing 85 to 95 mole percent ethylene, the second layer comprising 20% to 40% of the thickness of the film.

The composition of the third layer of this film comprises a third polypropylene polymer, as a copolymer containing 3 to 8 weight percent ethylene. The third layer comprises 5% to 15% of the thickness of the film.

The third layer may contain up to about 20% by weight of the above recited ethylene butene-1 copolymer.

In some of the highly preferred embodiments, the composition of the third layer comprises less of the polypropylene, namely 65% to 75% by weight, and 10% to 20% by weight of the ethylene butene-1 in combination with 10% to 20% by weight of SEBS.

For use of highly preferred embodiments in certain environments, the composition of the third layer is preferred to comprise 55% to 65% by weight of the polypropylene, 20% to 30% by weight of ethylene butene-1, and 10% to 20% by weight of the SEBS.

Four layer films of the invention include thin outer layers having high amounts of polypropylene and comparatively lesser amounts of the ethylene butene-1 copolymer and the third elastomeric component. The two intermediate layers are substantially thicker and contain larger amounts of the ethylene butene-1 and optionally the third elastomer component.

The first layer corresponds with the first layer of the earlier recited films. It comprises about 20% up to about 70% of the thickness of the film. The composition of the first layer is (i) a polypropylene which contains 1 to 8 weight percent random moieties of ethylene, (ii) 5% to about 50% of the ethylene butene-1 copolymer, and (iii) up to about 25% SEBS.

The second layer is on one surface of the first layer and has the same range of compositions as the first layer, except that the ethylene content of its polypropylene is in the range of from 0% up to about 7%.

The third layer comprises a polypropylene copolymer containing 1 to 8 weight percent, preferably 5 to 7 weight percent, random moieties of ethylene. The third layer is on the other surface of the first layer and optionally contains up to 30% ethylene butene-1 copolymer. To the extent the ethylene butene-1 is present in an amount greater than 15% to 20% of the composition of the third layer, SEBS is preferably included in the composition in a ratio of 0.2/1 to 0.8/1 SEBS to ethylene butene-1. The third layer is present in an amount of 5% to 20% of the thickness of the film, most preferably about 10%, and forms the innermost surface layer of the film in heat sealed packages.

The other surface of the film, which would form the outer surface of a package, is the fourth layer, which is disposed on that surface of the second layer which is opposite the first layer. The fourth layer contains polypropylene polymer containing 0 to 7 weight percent random moieties of ethylene and up to 25% ethylene butene-1 copolymer. The fourth layer comprises 5% to no more than 20% of the thickness of the film.

The combined thicknesses of the second and fourth layers is at least 15% to 50%, preferably 20% to 40% of the overall thickness of the film.

Any of the films of the invention may be made into heat sealed packages.

It should be noted that one of the outer layers of the film has a lesser ethylene content in the polypropylene component than does the other outer layer of the film. In forming the packages, that outer layer of the film which contains the lesser amount of ethylene in its polypropylene component is positioned toward the outside of the package.

In the recited two layer compositions, the outer surface layer of the film may be coated with a conventional varnish before the package is formed. The varnished surface provides an anti-blocking capability to prevent the surfaces of the several packages from sticking to each other, especially during the high temperature processing of the packages.

In the three layer films, the composition of the outer film layer having the lesser ethylene content in its polypropylene is so selected that the outer layer of the film, which forms the outer surface of the package, provides the antiblock properties without the use of the varnish overcoat.

Thus the films of the invention may be made into packages wherein the outer layer of the package is a layer of the film which has the lower ethylene content polypropylene in its composition. That outer layer of the film which is characterized by the higher ethylene content polypropylene component is disposed toward the interior of the package and participates in forming the heat seals. To the extent the package contains only the recited first and second layers, as recited with respect especially to the two layer film, a coating of varnish may be applied to the surface layer having the lesser ethylene content in the polypropylene before the package is formed.

After packages have been formed, the packages may be filled with contents, sealed closed, and retort processed.

DETAILED DESCRIPTION OF THE ILLUSTRATED EMBODIMENTS

The invention encompasses a variety of novel compositions, and articles which can be formed such as by extruding or otherwise molding or laminating multiple layer films. Such films are typically thin and flexible, being generally on the order of about 2 mils to about 10 mils thick. Thicker sections and shapes may also be formed, as for other uses.

Preferred embodiments are those wherein three layer film is fabricated from compositions, each of which contains a significant fraction of polypropylene. In these embodiments each layer is affixed to its one or more adjacent layers in surface to surface contact with them, and is bonded to them with good adhesion.

Other embodiments of the invention are those wherein two layer films are fabricated from two polypropylene-based compositions.

In yet other embodiments, four layer films are fabricated from four polypropylene-based compositions.

Figure 1:
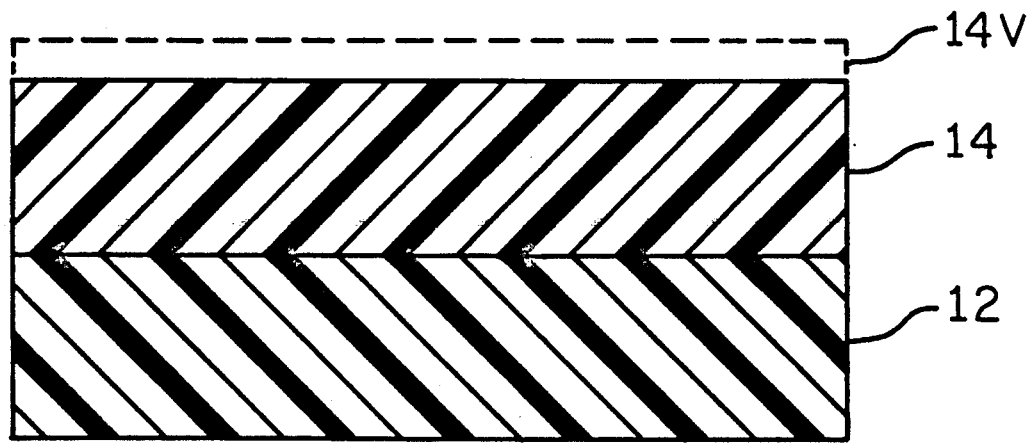
FIG. 1 is a cross-section of a two layer film of this invention.

Turning now to the drawings, FIG. 1 represents a cross-sectional view of a two layer film of the invention. Layer 12, a first layer, is a blend of a polypropylene copolymer containing 1 to 8 weight percent random moieties of ethylene, an ethylene butene-1 copolymer containing 85 to 95 mole percent ethylene, and up to 20% of a third component providing elastomeric properties and selected from the group consisting of ethylene propylene copolymer, polybutylene, polyisobutylene, ethylene propylene diene monomer terpolymer, styrene butadiene styrene copolymer, styrene ethylene butylene styrene copolymer, styrene isoprene styrene copolymer, polybutene-1, and isobutylene isoprene copolymer.

Layer 14, a second layer, is a blend of a polypropylene containing up to 7 weight percent random ethylene moieties and an ethylene butene-1 copolymer containing 85 to 95 mole percent ethylene. The random moiety ethylene content in the polypropylene in layer 14 is at least one weight percent less than the random moiety ethylene content in the polypropylene in layer 12. Turning now to the composition of layer 12 in detail, the polypropylene component is a copolymer containing 1 to 8 weight percent, preferably 5 to 7 weight percent, most preferably 5.5 to 6.5 weight percent, random moieties of ethylene. The polypropylene is highly desirable in that it provides a desired level of tolerance for the high temperatures to which films and packages of this invention will be subjected, especially in sterilizing medical or shelf stable foods.

In accommodation of the known brittleness of polypropylene, and especially as regards flex cracking and shock abuse cracking after being subjected to the high temperature retort processing, modifying materials are desirably included in the composition of layer 12. As a modifying material, the second component in layer 12 is 5% to 50% by weight of an ethylene butene-1 copolymer which contains 85 to 95 mole percent ethylene, and has a melting point temperature of about 65° C. to about 85° C. as measured by DSC curve. And while the ethylene butene-1 copolymer is highly advantageous in providing to layer 12 a high level of capability for, and tolerance of, repeated flexing of the film, its melting point temperature is below the anticipated retort processing temperature of about 121° C. to which the fabricated package is typically subjected. Thus the ethylene butene-1 copolymer tends to be melted at the high processing temperature. While the composition is at the elevated processing temperature of about 121° C., the function of the ethylene butene-1 may be likened to that of plasticizers conventionally injected as liquid during conventional extrusion processing operations. To the extent lower levels of ethylene butene-1 are included in the composition, namely up to about 20%, the ethylene butene-1 and the polypropylene may be used quite satisfactorily as a two component composition. Where over 20% ethylene butene-1 is included in the composition, and especially over 30% ethylene butene-1 copolymer, two component compositions of polypropylene and ethylene butene-1 copolymer tend to be deficient in dimensional stability at the elevated processing temperatures. Thus where over 20% ethylene butene-1 is incorporated into the composition, it is preferred to include a third component which acts to provide dimensional stability to the layer at the elevated processing temperature, while maintaining the excellent flexural properties provided by the ethylene butene-1 copolymer. The third component materials are generally elastomeric and provide elastomeric properties. Exemplary of materials which can be used as the third component in layer 12 are ethylene propylene copolymer, polybutylene, polyisobutylene, ethylene propylene diene monomer terpolymer, styrene butadiene styrene copolymer, styrene ethylene butylene sytrene, styrene isoprene styrene copolymer, polybutene-1, and isobutylene isoprene copolymer. Preferred for the third elastomeric component is styrene ethylene butylene styrene.

In general the amount of the third component is less that the amount of the ethylene butene-1 copolymer second component. Especially with respect to the use of SEBS as the third component, the ratio of the amount of the amount of the third component to the amount of the second component, by weight, is preferably 0.2/1 to 0.8/1. In less preferred embodiments, the ratio may be up to 1.25/1, and even up to 5/1.

Turning now to layer 14 of FIG. 1, the first component is a polypropylene polymer containing up to about 7 weight percent random moieties of ethylene. While a homopolymer can be used, a copolymer having about 3% to about 5% ethylene is preferred, in order to contribute to a preferred level of resilience in the overall multiple layer film.

The polypropylene component of layer 14 is present in an amount of about 50% to about 95%, preferably 50% to 80%, by weight of the composition (including such typical additives as slip, anti-block, color, etc. which may be used as in conventional practice in other compositions with polypropylene type polymers). The balance of the composition of layer 14 is preferably the above mentioned ethylene butene-1 copolymer containing 85% to 95% ethylene. Thus the ethylene butene-1 copolymer comprises 50% to 5%, preferably 50% to 20%, of the composition of layer 14.

It is a very important feature of this invention that the melting point temperature of the polypropylene in layer 14 is greater than the melting point temperature of the polypropylene in layer 12. The melting point of the polypropylene has a significant effect on the amount of heat that the composition can tolerate.

A polypropylene having a low melting point temperature is selected for the first component polypropylene of layer 12. A typical polypropylene, having 5 to 7 percent random ethylene has a melting point temperature of about 127° C. This relatively low melting temperature is important in the rapid formation of strong heat seals in packages during the packaging operation. While higher melting temperature polypropylenes can form heat seals, typically the formation of the seal requires more heat energy, and longer residence time in formation of the seal. And the resulting seal is usually inferior to seals made with a lower melting temperature polypropylene. The higher ethylene content also makes a desirable contribution to the flexural properties of the composition.

A polypropylene having a higher melting point temperature is selected for the first component polypropylene of layer 14. A typical polypropylene, having 3 to 5 percent ethylene has a melting point temperature of about 135° C. This relatively higher melting temperature is important in providing dimensional and thermal stability to the package during the retort processing operation. To the extent the polypropylene in layer 14 contains ethylene as a comonomer, it contributes added flexural properties to the film.

It is important that at least 30%, preferably at least 50%, of the overall film thickness contain the lower melting point (and thus higher random ethylene content) polypropylene, in order to provide for fast, efficient formation of strong heat seals having a substantial tolerance for high temperatures.

It is equally important that at least 15%, preferably at least 20%, of the overall film thickness contain the higher melting point (and thus lower random ethylene content) polypropylene, in order to provide dimensional and thermal stability to the package during the retort processing operation.

To the extent that less than 30% of the film thickness contains the lower melting polypropylene, the films have less capability for rapidly forming strong heat seals as in the films of the invention. To the extent less than 15% of the film thickness contains the higher melting polypropylene, the films have less dimensional and thermal stability during retort processing.

Thus it is critical that the films of the invention contain both the higher melting polypropylene and the lower melting polypropylene, within the amounts recited herein, and in the appropriate layer arrangements. The definition of higher and lower melting temperatures for the polypropylenes are relative, within the ranges specified. The melting temperatures of the higher and lower melting point polypropylenes generally differ by at least 3° C., preferably at least 5° C., which corresponds to generally 1% and 1.5% differences in the random ethylene content.

Films containing only a higher melting polypropylene are deficient in heat sealing and flexural properties as compared to corresponding films of the invention. Films containing only a lower melting polypropylene are deficient in dimensional and thermal stability as compared to corresponding films of the invention.

In general, combinations of polypropylene having the disparate thermal properties recited herein, are characterized by different levels of ethylene as random moieties in the propylene polymer. Thus, typically polypropylenes which complement each other with respect to the disparate thermal properties desired herein are found to have ethylene contents which differ by at least one weight percent, especially 1.5 to 2 weight percent. The polymer having the lower fraction of ethylene in its composition generally has the higher heat tolerance, and thus is used for layer 14. The propylene polymer having the higher level of ethylene generally has the lower heat tolerance as relates to softening, and thus is advantageously used in forming heat seals as required of the layer 12 composition. While the illustrated embodiments are described with respect to differences in the ethylene content, as regards the propylene polymers in layers 12 and 14, the scope of the invention includes all those pairs of propylene polymers for use in layers 12 and 14 which exhibit differences in thermal properties which differences are similar to the differences seen in typical propylene polymers having random ethylene content differences of at least 1 weight percent and up to 8 weight percent, preferably 1 percent to 4 percent. Therefore, wherever herein a difference is recited with respect to the ethylene content, it is intended to include all combinations of propylene polymers which exhibit, the thermal property differences characteristic of the different ethylene contents.

As has been discussed earlier, it has also been found desirable to modify the polypropylene polymer in both layers in order to overcome its tendency toward brittleness and the lack of shock abuse tolerance by adding to the composition of both layers 12 and 14 an ethylene butene-1 modifier. The ethylene butene-1 is substantially above its melting-temperature at the retort processing temperature of about 121° C., and so tends to act like a liquid at those conditions. Below its melting temperature it acts more like an elastomer.

Turning now to the properties of the blend composition, especially of layer 14 at the processing temperature of about 121° C., it is seen that the ethylene butene-1 is above its melting point temperature at the elevated retort processing conditions. At higher levels of content of the ethylene butene-1 copolymer, for example 35% by weight, the like layers 14, of adjacent 2-layer packages, which like layers 14 are in contact with each other at that temperature, tend to be thermally welded to each other in a process commonly known as "blocking", whereby a portion of one package is bonded to a portion of an adjacent package by virtue of contact between the two packages and the elevated temperature. This tendency to block appears to be related to the ethylene butene-1 content.

In order to overcome this tendency of the packages to become bonded to each other during the elevated temperature processing, the films in FIG. 1 are preferably overcoated with a varnish layer 14V shown in dashed outline. The varnish does not block at the elevated processing temperature, and thus provides a barrier to the potential blocking contact between the packages.

While the application of a coat of varnish 14V to layer 14 as shown in FIG. 1 does provide a film which can be satisfactorily used in making heat stable packages, the addition of the varnish requires a coating process which must be performed after the film has been fabricated, by, for example, coextrusion.

Figure 2:
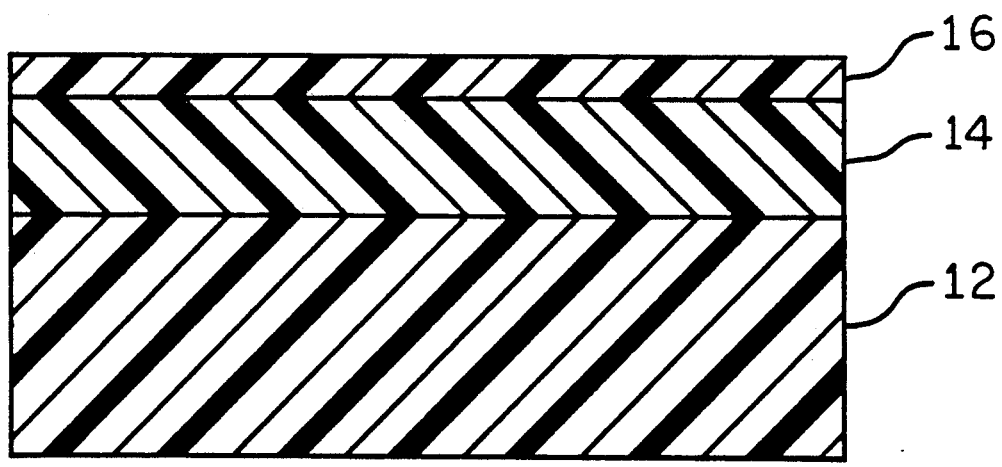
FIG. 2 is a cross-section of one family of embodiments of three layer films of this invention.

FIG. 2 shows a preferred embodiment, derived from FIG. 1, in that an additional layer 16 is adhered to layer 14, with layer 14 thus being positioned between layers 12 and 16. Whereas, when layer 14 is the outer layer of the film as in FIG. 1, it is normal to use slip and anti-block concentrates in its composition, when layer 14 is an interior layer as in FIG. 2, slip and anti-block concentrates are omitted. Rather, the slip and anti-block concentrates are used in the layer which will form the outer surface of the finished package, which in FIG. 2 is layer 16. The composition of layer 16 is greater than 75%, preferably about 75% to about 95% by weight of a polypropylene polymer having a random ethylene moiety content of up to about 7%, preferably 3% to 5%. As a second component the composition of layer 16 includes up to about 25% by weight of the above ethylene butene-1 copolymer, preferably 5% to 25%, most preferably 10% to 20%.

The function of layer 16 is that of preventing the highly modified composition of layer 14, which has the tendency for blocking, from contacting a similar highly modified layer 14 in an adjacent package during the high temperature processing. The function of layer 16 is thus related to the shielding function of varnish coating layer 14V in FIG. 1.

The thickness of layer 16 need not be any greater than that thickness required to provide a substantially uniform and continuous coating on the surface of layer 14. Layer 16 generally comprises about 5% to about 15% of the thickness of the film, typically about 10%. Since layer 16 is so thin, the fact that it is less highly modified does not unacceptably reduce the flexibility and shock tolerance obtained in layers 12 and 14 by the substantial use of modifiers in those layers. Indeed, especially where the thickness of layer 16 is in the lower end of the recited range of 5% to 15%, it is acceptable to use polypropylene without the ethylene butene-1 modifier.

In the 3-layer embodiment of FIG. 2, layer 14 contains 30% to 70% preferably 45% to 70% polypropylene polymer, 5% to 50%, preferably 30% to 40% of the ethylene butene-1 copolymer, and optionally up to 25% of the third elastomeric component, and especially styrene ethylene butylene styrene copolymer. In those embodiments where the third component is used, it preferably comprises 5% to 20% by weight of the layer composition, and generally comprises a ratio of 0.2/1 to 0.8/1 as related to the amount of the ethylene butene-1 copolymer.

Another function descriptive of the performance criteria of the polypropylenes in layers 12 and 14, and characterizing the differences thereof, is that the polypropylene in layer 14, having the higher melting point temperature, provides to the film a dimensional stability which provides overall distortion-free properties to the film when the total thickness of the layers comprising the lower ethylene content polypropylene is at least 15%, preferably at least 20% of the thickness of the film. Thus at least 15% of the thickness of the film comprises at least one layer having a polypropylene whose random ethylene content is at least 1 weight percent less than the combined random ethylene content of the rest of the layers.

Where lesser fractions of the film thickness are represented by the lower ethylene content polypropylene, at least some distortion of the film is typically experienced, either during the heat sealing process where the package seals are formed, or especially during the high temperature processing at about 121° C. Where the amount of polypropylene polymer represented by the lower ethylene content is 20% or more of the thickness of the film, generally the film can be fabricated into packages by the formation of heat seals and the packages can be heat processed at about 121° C., both without significant distortion of the packages. In general, the overall composition of the film should comprise at least 15% by weight, preferably at least 20%, of the higher melting polypropylene, in order to obtain the excellent thermal and dimensional stabilities characteristic of the instant invention.

Figure 3:
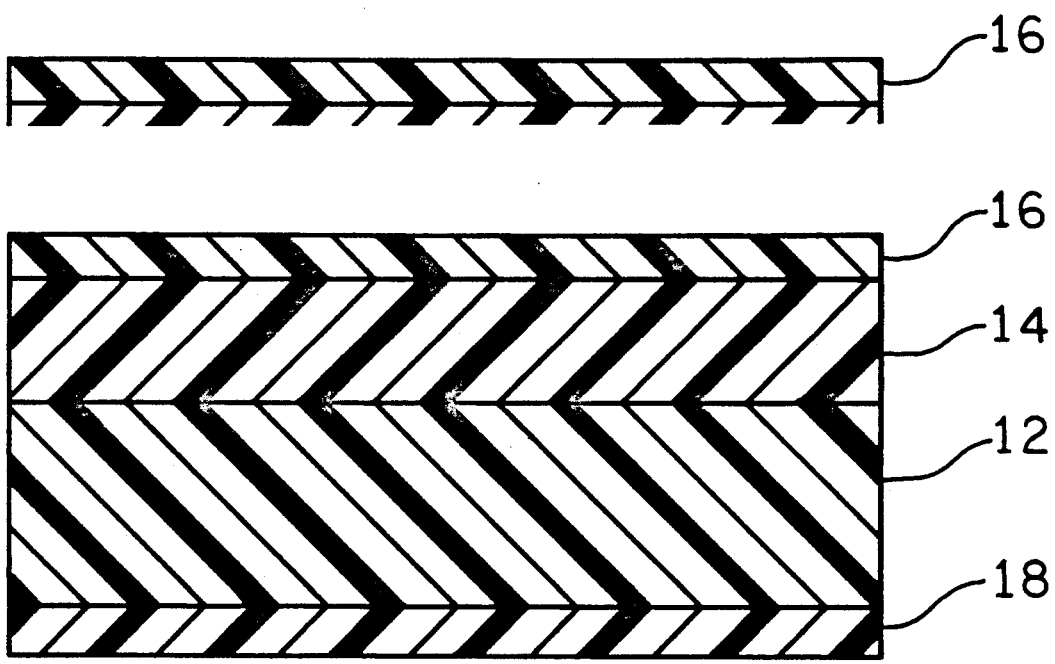
FIG. 3 is a cross-section of a family of four layer films of this invention.

Thus in the FIG. 1 embodiment, layer 14 represents at least 20%, preferably 30% to 50%, of the thickness of the film. In FIG. 3, the layer 16 composition contains the lower ethylene content polypropylene. It also contains a lower fraction, if any, of the ethylene butene-1 modifier than is contained in layer 14. Layer 16 is relatively thin, comprising no more than about 15% of the thickness of the film, which is sometimes not enough to ensure dimensional stability of the film. Thus it is normal that layer 14 also comprise a lower ethylene content polypropylene, for derivation therefrom of the balance of the desired dimensional and thermal stability. To the extent the combination of layers 14 and 16 is quite thick, layer 14 can include a somewhat higher ethylene content polypropylene than that of layer 16, although its ethylene content is still lower than the ethylene content of the polypropylene in layer 12.

One of the purposes of the shielding of layer 14, as by layer 16, is to preserve the freedom to substantially modify the polypropylene in layer 14 by means of the ethylene butene-1 copolymer, and optionally up to 25% of the third component elastomer, and especially SEBS, to thus enhance the elastic resilience of the film, and especially layer 14. To the extent a lower ethylene content polypropylene is used in layer 14 it tends to work against the softening and elastic resilience properties of the ethylene butene-1 copolymer modifier. Thus, in general, if the ethylene content of the polypropylene in layer 14 is different from the ethylene content of the polypropylene in layer 16, the polypropylene in layer 14 will generally have a higher ethylene content than that of layer 16, and that ethylene content will be intermediate with respect to the ethylene content of the polypropylenes in layers 12 and 16. The benefits of fine tuning the ethylene content of the polypropylene in layer 14 relative to layer 16 is rather minimal, though, compared to the benefit that can be obtained by adjusting the ethylene butene-1 copolymer content. So in the interest of simplifying the overall structural composition, and the process of forming and fabricating the film, as well as the number of materials which must be purchased, inventoried, etc., the polypropylenes used in layers 14 and 16 are typically the same. Layer 16 is used as a shield to prevent layer 14 from contacting another layer 14 of an adjacent package. The amount of modification in layer 14 can then be freely selected without concern for layer 14 blocking during the retort processing.

In some applications of packages made with films of the invention, the high level of modification in layer 12, namely the ethylene butene-1 copolymer and the elastomer, leaves layer 12 with a tendency to bond to adjacent portions of itself on the inside of a package during the high temperature retort processing. Thus the package may be susceptible to deformation and distortion, during the retort processing, in the cases where layer 12 is disposed on the interior of the package and includes high levels of modification of the polypropylene.

Figure 5:
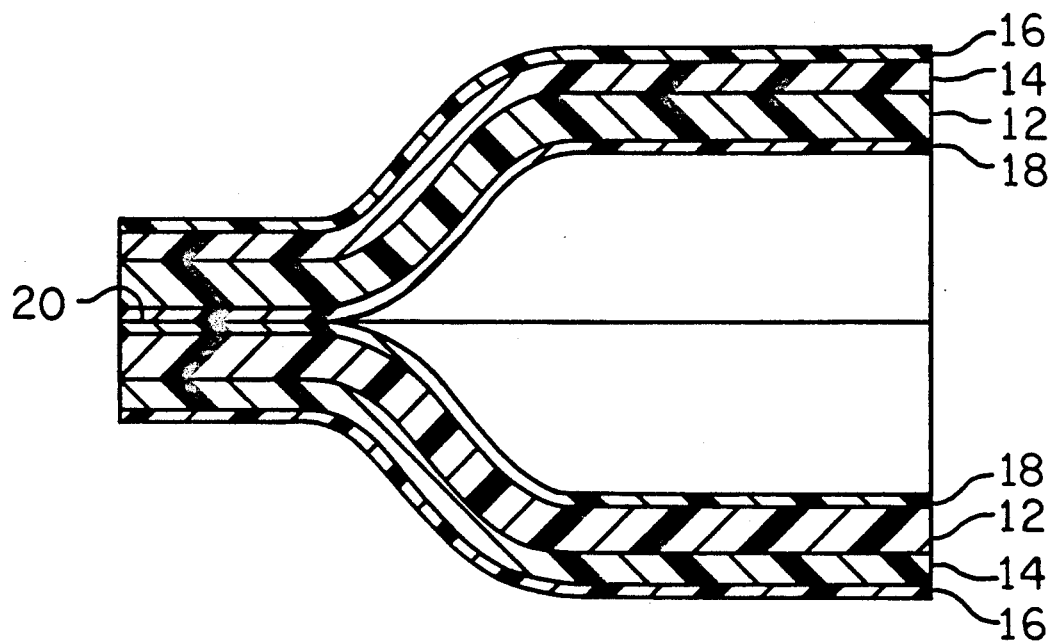
FIG. 5 is a fragmentary cross-section of a portion of a pouch made using four layer films as of FIG. 3 of this invention.

FIG. 3 shows a 4 layer film wherein the compositions of layers 12, 14, and 16 are essentially the same as they are in FIG. 2. Layer 18 has been added on the previously exposed surface of layer 12. The composition of layer 18 is a polypropylene, as a copolymer containing 1 to 8 weight percent, preferably 5 to 7 weight percent most preferably 5.5 to 6.5 weight percent, random moieties of ethylene; and optionally up to 30% of the ethylene butene-1 copolymer. In general, the function of layer 18 in covering layer 12 is similar to the shielding function of layer 16 with respect to layer 14. In the same context within which a thin layer of layer 16 (containing a smaller amount of the ethylene butene-1 modifier) protects layer 14 from bonding to adjacent layers 14, so a thin layer 18 of a polypropylene having a lower level of modification according to the ethylene butene-1 copolymer is used to cover layer 12 and similarly prevent the bonding together of adjacent layers 12 by interposing adjacent layers 18 between adjacent layers 12 such that the layers 12 cannot touch each other as seen in FIG. 5. Rather, adjacent layers 18 touch each other, and, with their lower level of modification, do not have the tendency to bond to each other. And since layer 18 is so thin, the fact that it is less highly modified does not unacceptably reduce the flexibility and shock tolerance obtained in layers 12 and 14 by the substantial use in layers 12 and 14 of modifiers in those layers.

Layer 18 generally comprises 5% up to about 20%, preferably about 10%, of the overall thickness of the 4-layer film. Layer 16 also comprises about 5% up to about 20%, preferably about 10% of the overall thickness of the film. Layer 12 comprises at least 20% up to about 70%, preferably about 50%, of the overall thickness of the film. Layer 14 comprises at least 15% up to about 55%, preferably about 30% to about 35% of the overall thickness of the film.

In the 4-layer film it is generally important that the combination of layers 14 and 16, overall, comprise a polypropylene composition having an ethylene content lower than the overall ethylene content of the combination of layers 12 and 18, in order to effect the recited disparate thermal properties. The relationship between the film of FIG. 3 and the film of FIG. 1 is that thin outer layers 18 and 16 have been added to both layers 12 and 14, respectively, to protect those layers from unintentionally bonding to like surfaces (of layer 12 or layer 14 respectively) especially during the high temperature retort processing. However, especially layer 18 must be capable of forming heat seal bonds when intended. And since it is a thin layer, it uses its cooperative excellent adhesion to layer 12 to enhance its heat sealing properties when heat seals are formed. Preferably, layers 18 and 12 should be susceptible to forming heat seals at a substantially common set of conditions, especially for those applications where layer 12 participates directly in forming the seal between the facing packaging portions. Accordingly, the polypropylene used in layer 18 should be generally similar to the polypropylene used in the adjacent layer 12.

The polypropylene of layer 16 is usually also similar to the polypropylene of layer 14. Indeed, it is highly acceptable for the polypropylene in layer 16 to be identical to the polypropylene used in layer 14. Similarly, it is highly acceptable for the polypropylene in layer 18 to be identical to the polypropylene used in layer 12. Within the context that layers 16 and 18 provide a degree of protection from the thermal consequences of the flexural and abuse tolerance designed into layers 12 and 14, layers 12 and 14, respectively, can be further modified, to a limited degree when the corresponding layers 18 and 16 are used as thermal barriers. It is still important, however, that layer 14 have a greater heat tolerance than layer 12, such that the advantageous disparate thermal properties are available for use in (i) the heat sealing process, (layer 12) and (ii) the high temperature retort processing (layer 14).

Referring now to layers 14 and 16 as a first combination and to layers 12 and 18 as a second combination, the combination of layers 12 and 18 preferably comprises 50% to 80% of the thickness of the film. Conversely, the combination of layers 14 and 16 preferably comprises 50% to 20% of the thickness of the film.

It is important that the composition of layer 12 be conducive both to heat sealing and to forming an excellent bond with layer 18, as the heat seal formed in the package when using a layer 18, although it is formed directly by layer 18, is supported and backed up by the properties and functioning of layer 12 through its excellent adhesion to layer 18. Without the excellent adhesion between layers 12 and 18, the thickness of layer 18 by itself, being up to only 20% of the thickness of the film, is generally inadequate to form the strong heat seals required for packaging shelf stable foods and medical products. Thus it is important that the compositions of both layers 12 and 18 be susceptible to heat sealing with respect to heat passing through layers 14 and 16. Similarly the thickness of the combination of layers 12 and 18 must be at least 25% of the thickness of the film, and preferably about 60%.

Figure 4:
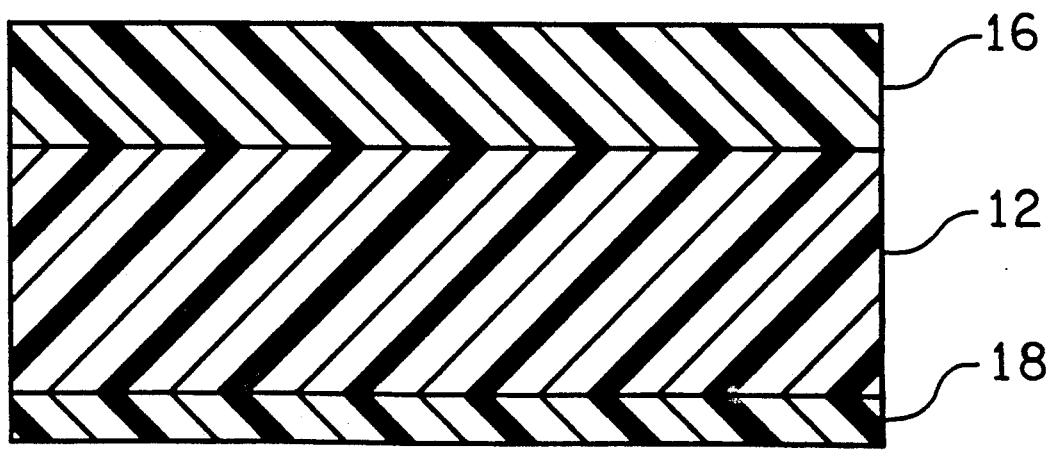
FIG. 4 is a cross-section of another family of three layer films of this invention.

Clearly, it is desirable to simplify the film to the extent possible. And while the 4-layer film is highly advantageous and has substantial flexibility in its design as well as in its physical use, the fourth layer does lend a degree of complexity which the inventors have found to be unnecessary in some embodiments, in that a highly desirable family of related 3-layer films has been discovered. FIG. 4 represents those 3-layer films. It includes layer 12, layer 16, and layer 18, with associated adjustments in both the composition of the layers and their thicknesses.

Layer 12 is at least about 40% and no more than about 75% of the thickness of the film. The composition of layer 12 in FIG. 4 is 35% to 70%, preferably 40% to 60%, of a higher ethylene content polypropylene as recited earlier. A second component of layer 12 is the ethylene butene-1 copolymer in an amount of 5% to 50%, preferably 30% to 40%, of the overall composition. A third component is one of the elastomers previously recited, and especially preferably the SEBS, in an amount up to about 20% by weight.

Layer 16 comprises at least 15% and up to 50%, preferably 20% to 40%, of the thickness of the film. Its composition is greater than 70%, preferably 70% to 95%, most preferably 80% to 90% of the lower ethylene content polypropylene previously recited and up to 25%, preferably 10% to 20%, of the ethylene butene-1 copolymer. The large fraction of the lower ethylene content polypropylene in the blend composition provides the dimensional stability of layer 16 during the retort processing, and thus the dimensional stability of the film. The use of the ethylene butene-1 copolymer provides sufficient flexibility to layer 16 while the low level of addition (namely only up to about 25%) protects against the potential bonding to adjacent layers 16 which bonding would be possible at higher levels of addition of the ethylene butene-1 copolymer. To the extent the ethylene butene-1 copolymer is present in an amount greater than about 20%, a third elastomeric component may optionally be included, as in the compositions previously recited.

The composition and thickness of layer 18 is the same as described for FIG. 3.

Thus, in the FIG. 4 embodiment, the flexibility previously attributed to layer 14 in the FIG. 3 embodiment has been incorporated into layer 12, while the thickness of layer 16 has been expanded, to at least 15%, to provide an adequate amount of the higher melting point temperature polypropylene which is capable of providing the thermal and dimensional stability to the overall film. Thus the thickness of layer 16 is critical to the thermal and dimensional stability of the film, while the degree of modification and the thickness of layer 12 is critical to the provision of flexibility and cracking resistance to the film, in combination with the higher ethylene content lending the properties of layer 12 to assisting in the formation of heat seals at layer 18.

FIG. 5 illustrates a cross-section of the seal area of a typical flexible pouch formed from facing portions of the sheet material of, for example, FIG. 3. It is seen that layer 18 is on the inside surface of the pouch and generally forms the heat seal contact surface, and prevents adjacent portions of layer 12 from contacting each other and inadvertently, and inappropriately, becoming bonded to each other. Layer 16 is on the outside surface of the pouch and provides a spacing function between the layers 14 in adjacent pouches, thus preventing the layers 14 of adjacent pouches from contacting each other and bonding during the high temperature processing.

Figure 6:
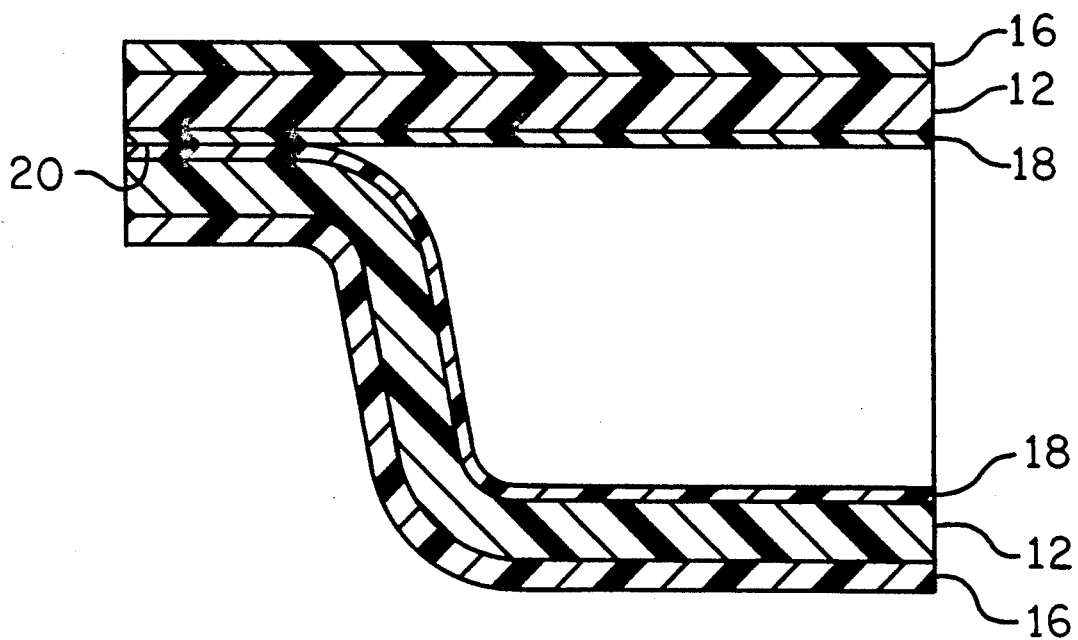
FIG. 6 is a fragmentary cross-section of a portion of a package made using three layer films of the invention as in FIG. 4, and including a thermoformed package portion and a non-formed covering of a lid material.

FIG. 6 is representative of another type of package which can be formed from films of the invention. In this case, a portion of the film has, previous to the fabrication of the package, been subjected to a thermal forming process, as in conventional thermoforming, to form a receptacle. A non-formed portion of the film is then used as a lid to close and seal the receptacle and thus the package. It is seen that sheet material from FIG. 4 has been used to illustrate the forming of the package in FIG. 6. Thus layer 18 of FIG. 6 provides the same function as seen at layer 18 in FIG. 5. Layer 12 provides the primary flexibility for the film. Layer 16, as in FIG. 4, is the primary means of providing, in the package, the properties of thermal and dimensional stability, as well as serving as a barrier to layers 12 of adjacent packages blocking to each other.

In the three layer embodiments, the polypropylene polymer of the core layer can be a blend including the polypropylene polymers used in the two outer layers, so long as the recited disparity in thermal properties of the several layers is maintained. In the four layer embodiments, the polypropylene polymers of layers 12 and 14 can each be a blend including the polypropylene polymers of the other layers, again so long as the disparity is maintained. For example, the polypropylene polymer of layer 12 can be a blend of the polypropylene polymers used in layers 14, 16, and 18. The polypropylene polymer of layer 14 can be a blend of the polypropylene polymers used in layers 12, 16, and 18.

The ethylene butene-1 copolymer, as used, in the several layers is preferably the same in all layers of a given film, to the extent it is used in each layer. Alternatively, the ethylene butene-1 may be different in the several layers, so long as each of the ethylene butene-1 compositions corresponds to the previously recited 85–95 percent ethylene content.

In some embodiments of the invention, it is entirely satisfactory for the polypropylene polymer in layers 14 or 16, or both, to be a homopolymer if the shock abuse anticipated for the package life cycle is somewhat reduced. While the use of homopolymer polypropylene sacrifices a degree of the shock abuse resistance, it similarly improves the capability of the film to tolerate high temperatures. Thus the selection of the composition of especially the polypropylenes in layers 14 and 16 is accorded a degree of flexibility commensurate with the level of shock abuse anticipated for the package over its life cycle.

Referring back to the 2-layer structure of the film shown in FIG. 1, and the potential deficiency in that either layer 12 or 14 may tend to block to an adjacent surface of a corresponding layer 12 or 14 during the high temperature process; and reflecting on the use of layers 16 and 18 in FIGS. 2, 3, and 4 as protective materials to prevent that blocking, another method of preventing the blocking from occurring is to reduce the contactable surface areas of the potentially blocking adjacent layers.

One extreme of this principle is seen in the use of layers 16 and 18, as interposing those respective layers between the corresponding ones of their adjacent layers 12 and 14 in the adjacent packages, so that no contact at all is possible between the potentially offending layers. Another method of achieving at least a partial reduction in the contacted surface area is to mechanically change the surface of the corresponding layers 12 or 14 (FIG. 1) by imparting a matte-type finish to the corresponding outer surface of the affected layer. Thus the outer surface of layers 12 and/or 14 may be mechanically fabricated in such a way that they have surface deformations such as ripples, knobs, knurles, etc., on a minute scale, which deformations reduce the actual area of surface-to-surface contact on a micro scale.

EXAMPLE 1

A 3-layer film is coextruded. Total thickness of the coextruded film is 0.18 mm. The first, or core layer, of the film is 60% of the overall thickness of the film. The composition of the first layer is a blend of (i) 50% by weight of a polypropylene copolymer containing 6 weight percent random ethylene moieties and having a melting point temperature of 127° C., (ii) 35% by weight Tafmer ® A-4085, an ethylene butene-1 copolymer from Mitsui Petrochemical Company, and (iii) 15% Kraton ® G-1652 styrene ethylene butylene styrene from Shell Chemical Company. The second layer is 30% of the overall thickness of the film. The composition of the second layer is a blend of (i) 85% by weight of a polypropylene copolymer containing 4 weight percent random ethylene moieties and having a melting point temperature of 135° C., and (ii) 15% by weight Tafmer A ethylene butene-1 copolymer. The polypropylene includes conventional slip and anti-block concentrates in a polypropylene base having 4% random ethylene moieties. The third layer comprises 10% of the thickness of the film. Its composition is comprised of the polypropylene polymer used in the first layer.

EXAMPLE 2

A three layer film, 0.20 mm thick, is coextruded as in EXAMPLE 1, except that the composition of the third layer is 85% of the same polypropylene and 15% Tafmer A.

EXAMPLE 3

A 0.20 mm, three layer, film is coextruded as in EXAMPLE 1 except that the composition of the third layer is 70% polypropylene, 15% Tafmer A and 15% Kraton G.

EXAMPLE 4

A 0.20 mm., three layer, film is coextruded as in EXAMPLE 1 except that the composition of the third layer is 60% polypropylene, 25% Tafmer A and 15% Kraton G.

EXAMPLE 5

A 0.20 mm., four layer, film is coextruded. A first interior layer is 50% of the overall thickness of the film. The composition of the first layer is (i) 50% by weight of a polypropylene copolymer containing 6 weight percent random ethylene moieties, (ii) 35% Tafmer A ethylene butene-1 copolymer, and (iii) 15% KRATON G. The second interior layer is 30% of the overall thickness of the film. The composition of the second layer is (i) 65% by weight of a polypropylene copolymer containing 5 weight percent random ethylene moieties, (ii) 25% Tafmer A ethylene butene-1 copolymer, and (iii) 10% KRATON G. The (third) outer layer, adjacent the second layer, is 10% of the overall thickness of the film and comprises (i) 90% of a polypropylene polymer containing 4 weight percent random ethylene moieties and (ii) 10% Tafmer A ethylene butene-1 copolymer. The (fourth) outer layer, adjacent the first layer, is 10% of the overall thickness of the film and comprises (i) 90% of a polypropylene polymer containing 6 weight percent random ethylene moieties and (ii) 10% Tafmer A ethylene butene-1.

EXAMPLE 6

A 0.20 mm., two layer, film is coextruded. The first layer is 60% of the overall thickness of the film. The composition of the first layer is 50% by weight of a polypropylene copolymer containing 6 weight percent random ethylene moieties and having a melting point temperature of 127° C., (ii) 35% by weight Tafmer A ethylene butene-1 copolymer, and (iii) 15% KRATON G. The second layer is 40% of the overall thickness of the film. The composition of the second layer is (i) 65% of a polypropylene copolymer having 4 percent random ethylene moieties and having a melting point temperature of 135° C. and (ii) 35% Tafmer A ethylene butene-1 copolymer. A coating of varnish is conventionally applied to the second layer of half of the film, and is omitted on the other half.

EXAMPLE 7

A 0.18 mm., three layer, film is coextruded. The composition of the first and second layers is the same as in EXAMPLE 6. The first layer is 60% of the overall film thickness as in EXAMPLE 6. The second layer is 30% of the overall film thickness, and is the interior (core) layer of the film. The third layer is 10% of the overall thickness of the film and is disposed on that surface of the second layer which is opposed to the first layer. The composition of the third layer is (i) 85% of a polypropylene copolymer containing 4 percent random ethylene moieties and having a melting point temperature of 135° C. and (ii) 15% Tafmer A ethylene butene-1 copolymer.

The films of EXAMPLES 1-7 are made into pouches using conventional heat sealing equipment and processes. The pouches are retort processed at 121° C. for 30 minutes. The retort processed pouches are all completely satisfactory for use as packages for etiher shelf stable foods or medical solutions. Packages made with the unvarnished film of EXAMPLE 6 are prevented from blocking with each other by specifically avoiding contact between the packages during the retort processing operation.

The third component of elastomer such as SEBS appears to function somewhat like a filament or a net type reinforcing material to provide dimensional stability and flexibility to the films, especially during the exposure to high temperature processing and to the high temperatures of the equipment used to form the heat seals.

While the applicants choose to not be bound by any theory, the function of the SEBS at the elevated processing temperature appears to be similar to that of reinforcing fiberglass, or the like, as a physical reinforcing material in the fabrication of articles using reinforced polymers. Applicants acknowledge that the SEBS elastomer appears to have the capability of becoming fluid at high enough temperature, as for extrusion, but at the temperatures of anticipated exposure in high temperature retort processing, i.e. 121° C., the ethylene butene-1 copolymer is melted and the SEBS is not; thus providing the reinforcing function. It is contemplated that at higher package processing temperatures, the third component elastomer would also melt, as in the extrusion process, and would not provide a dimensional stabilizing function. While applicants have not conducted experiments to determine those temperatures, it is anticipated that thermal processing would be acceptable at temperatures higher than 121° C., and especially for periods longer than 30 minutes, and still benefit from the overall reinforcing function of the SEBS or other elastomer.

The reinforcing function may reside in the third component having a melting point temperature above that of the ethylene butene-1 copolymer, and above the elevated retort processing temperature, i.e. 121° C., with or without a multidimensional net-type molecular structure, which net-type structure is, as with SEBS, essentially disbanded on melting and re-formed on freezing.

While the third component appears to be providing a reinforcing property, it is also cooperating in the provision of elastomeric properties to the composition, as compared to the properties of polypropylene without the incorporation of any elastomers or ethylene butene-1 copolymer thereinto. Thus the function of the third component appears to be that of making the function of the ethylene butene-1 copolymer compatible with the thermal property requirements of the film, while allowing the ethylene butene-1 copolymer to perform its function of softening the polypropylene composition and giving the overall composition improved tolerance for shock stresses and for repeated flexing stresses.

Melting point temperature as used herein is as defined by ASTM D-3418, and following standard industry practice.

As is well known, retort processing conditions vary, depending on the application. Retort processing usually implies temperatures above 100° C. Processing time typically ranges from about 5 minutes to over 30 minutes. Thus "retort processing," as used herein, is in harmony with the generally accepted definition in the industry, and wherein temperatures are above 100° C.

Thus it is seen that the invention provides novel compositions, and an improved multiple layer film for use in packaging, and especially for use in the fabrication of packaging for sterile medical products or shelf stable foods which are subject to high temperature processing.

The invention also provides the capability for the use of polypropylene in all of the layers. This takes advantage of the high temperature processing tolerance of polypropylene while providing the abuse tolerance afforded by the modifying ethylene butene-1 copolymer and the third component elastomer. Further, the excellent barrier to water vapor transmission, accorded by polypropylene, is obtained by the use of substantial amount of polypropylene in all the layers.

Having thus described the invention, what is claimed is:

1. A multiple layer film, comprising:
  (a) a first layer, the composition of said first layer being a blend of (i) as a first component, 40% to 80% by weight of a first polypropylene, as a copolymer containing 1 to 8 weight percent random moieties of ethylene, (ii) as a second component, 5% to 50% by weight of a first ethylene butene-1 copolymer containing 85 to 95 mole percent ethylene, and (iii) a third component providing elastomeric properties and being selected from the group consisting of ethylene propylene copolymer, polybutylene, polyisobutylene, ethylene propylene diene monomer terpolymer, styrene butadiene styrene copolymer, styrene ethylene butylene styrene copolymer, styrene isoprene styrene copolymer, polybutene-1, and isobutylene isoprene copolymer; and (b) a second layer, the composition of said second layer being a blend of (i) a second polypropylene polymer containing up to 7 weight percent random moieties of ethylene and (ii) 5% to 50% by weight of a second ethylene butene-1 copolymer containing 85 to 95 mole percent ethylene, wherein the random moiety ethylene content in said polypropylene in said second layer is at least 1 weight percent less than the random moiety ethylene content in said polypropylene in said first layer.

2. A multiple layer film as in claim 1 wherein the composition of said second layer comprises 50% to 80% of said second polypropylene and 50% to 20% of said second ethylene butene-1 copolymer.

3. A multiple layer film as in claim 2 wherein said first layer comprises 40% to 60% of said first polypropylene, 30% to 40% of said first ethylene butene-1 copolymer and, as said third component, 10% to 20% of styrene ethylene butylene styrene copolymer.

4. A multiple layer film as in claim 1, said second layer comprising 25% to 75% of the thickness of said film and conversely said first layer comprising 75% to 25% of the thickness of said film.

5. A multiple layer film as in claim 2, said second layer comprising 25% to 75% of the thickness of said film and conversely said first layer comprising 75% to 25% of the thickness of said film.

6. A multiple layer film as in claim 1 and including a third layer, the composition of said third layer comprising (i) as a first component, a polypropylene polymer containing up to 7 weight percent random moieties of ethylene and (ii) up to 25% by weight of a third ethylene butene-1 copolymer containing 85 to 95 mole percent ethylene, said second layer being between said first and third layers, all the layers of said film being held together with good adhesion.

7. A multiple layer film as in claim 2 and including a third layer, the composition of said third layer comprising (i) as a first component, a polypropylene polymer containing up to 7 weight percent random moieties of ethylene and (ii) up to 25% by weight of a third ethylene butene-1 copolymer containing 85 to 95 mole percent ethylene, said second layer being between said first and third layers, all the layers of said film being held together with good adhesion.

8. A multiple layer film as in claim 3 and including a third layer, the composition of said third layer comprising (i) as a first component, a polypropylene polymer containing up to 7 weight percent random moieties of ethylene and (ii) up to 25% by weight of a third ethylene butene-1 copolymer containing 85 to 95 mole percent ethylene, said second layer being between said first and third layers, all the layers of said film being held together with good adhesion.

9. A multiple layer film as in claim 4 and including a third layer, the composition of said third layer comprising (i) as a first component, a polypropylene polymer containing up to 7 weight percent random moieties of ethylene and (ii) up to 25% by weight of a third ethylene butene-1 copolymer containing 85 to 95 mole percent ethylene, said second layer being between said first and third layers, all the layers of said film being held together with good adhesion.

10. A multiple layer film as in claim 5 and including a third layer, the composition of said third layer comprising (i) as a first component, a polypropylene polymer containing up to 7 weight percent random moieties of ethylene and (ii) up to 25% by weight of a third ethylene butene-1 copolymer containing 85 to 95 mole percent ethylene, said second layer being between said first and third layers, all the layers of said film being held together with good adhesion.

11. A multiple layer film as in claim 6, said second layer comprising 25% to 35% of the thickness of said film, said first layer comprising 50% to 70% of the thickness of said film and said third layer comprising 5% to 15% of the thickness of said film.

12. A multiple layer film as in claim 7, said second layer comprising 25% to 35% of the thickness of said film, said first layer comprising 50% to 70% of the thickness of said film and said third layer comprising 5% to 15% of the thickness of said film.

13. A multiple layer film as in claim 8, said second layer comprising 25% to 35% of the thickness of said film, said first layer comprising 50% to 70% of the thickness of said film and said third layer comprising 5% to 15% of the thickness of said film.

14. A multiple layer film as in claim 1 wherein said third component of said first layer comprises styrene ethylene butylene styrene copolymer.

15. A multiple layer film as in claim 2 wherein said third component of said first layer comprises styrene ethylene butylene styrene copolymer.

16. A multiple layer film as in claim 3 wherein said third component of said first layer comprises styrene ethylene butylene styrene copolymer.

17. A multiple layer film as in claim 5 wherein said third component of said first layer comprises styrene ethylene butylene styrene copolymer.

18. A multiple layer film as in claim 6 wherein said third component of said first layer comprises styrene ethylene butylene styrene copolymer.

19. A multiple layer film as in claim 7 wherein said third component of said first layer comprises styrene ethylene butylene styrene copolymer.

20. A multiple layer film as in claim 8 wherein said third component of said first layer comprises styrene ethylene butylene styrene copolymer.

21. A multiple layer film as in claim 10 wherein said third component of said first layer comprises styrene ethylene butylene styrene copolymer.

22. A multiple layer film as in claim 11 wherein said third component of said first layer comprises styrene ethylene butylene styrene copolymer.

23. A multiple layer film as in claim 12 wherein said third component of said first layer comprises styrene ethylene butylene styrene copolymer.

24. A multiple layer film, comprising:
(a) a first layer, the composition of said first layer being a blend of (i) as a first component, a first polypropylene, as a copolymer containing 1 to 8 weight percent random moieties of ethylene, (ii) as a second component, 5% to 50% by weight of a first ethylene butene-1 copolymer containing 85 to 95 mole percent ethylene, and a third component providing elastomeric properties and being selected from the group consisting of ethylene propylene copolymer, polybutylene, polyisobutylene, ethylene propylene diene monomer terpolymer, styrene butadiene styrene copolymer, styrene ethylene butylene styrene copolymer, styrene isoprene styrene copolymer, polybutene-1, and isobutylene isoprene copolymer;

(b) a second layer, the composition of said second layer being a blend of (i) a second polypropylene polymer containing up to 7 weight percent random moieties of ethylene and (ii) up to 25% by weight of a second ethylene butene-1 copolymer containing 85 to 95 mole percent ethylene; and (c) a third layer, the composition of said third layer comprising a third polypropylene, as a copolymer containing 1 to 8 weight percent random moieties of ethylene, said first layer being between said second and third layers, and wherein the random moiety ethylene content in said polypropylene in said second layer is at least 1 weight percent less than the random moiety ethylene content in said polypropylene in at least one of said first and third layers.

25. A multiple layer film as in claim 24 wherein said second layer comprises at least 20% of the thickness of said film and wherein said second polypropylene in said second layer comprises at least 15% by weight of the composition of said film.

26. A multiple layer film as in claim 24 wherein said third layer comprises 5% to 15% of the thickness of said film.

27. A multiple layer film as in claim 25 wherein said third layer comprises 5% to 15% of the thickness of said film.

28. A multiple layer film as in claim 24 wherein said third component in said first layer comprises styrene ethylene butylene styrene copolymer.

29. A multiple layer film as in claim 25 wherein said third component in said first layer comprises styrene ethylene butylene styrene copolymer.

30. A multiple layer film as in claim 26 wherein said third component in said first layer comprises styrene ethylene butylene styrene copolymer.

31. A multiple layer film as in claim 27 wherein said third component in said first layer comprises styrene ethylene butylene styrene copolymer.

32. A multiple layer film as in claim 24 and including, in the composition of said third layer, up to 20% by weight of a second component comprising a third ethylene butene-1 copolymer containing 85 to 95 mole percent ethylene.

33. A multiple layer film as in claim 25 and including, in the composition of said third layer, up to 20% by weight of a second component comprising a third ethylene butene-1 copolymer containing 85 to 95 mole percent ethylene.

34. A multiple layer film as in claim 26 and including, in the composition of said third layer, up to 20% by weight of a second component comprising a third ethylene butene-1 copolymer containing 85 to 95 mole percent ethylene.

35. A multiple layer film as in claim 27 and including, in the composition of said third layer, up to 20% by weight of a second component comprising a third ethylene butene-1 copolymer containing 85 to 95 mole percent ethylene.

36. A multiple layer film as in claim 28 and including, in the composition of said third layer, up to 20% by weight of a second component comprising a third ethylene butene-1 copolymer containing 85 to 95 mole percent ethylene.

37. A multiple layer film as in claim 29 and including, in the composition of said third layer, up to 20% by weight of a second component comprising a third ethylene butene-1 copolymer containing 85 to 95 mole percent ethylene.

38. A multiple layer film as in claim 30 and including, in the composition of said third layer, up to 20% by weight of a second component comprising a third ethylene butene-1 copolymer containing 85 to 95 mole percent ethylene.

39. A multiple layer film as in claim 31 and including, in the composition of said third layer, up to 20% by weight of a second component comprising a third ethylene butene-1 copolymer containing 85 to 95 mole percent ethylene.

40. A multiple layer film as in claim 32, said second component in said third layer comprising 10% to 30% by weight of the overall composition of said third layer, and including, in the composition of said third layer, up to 20% of a third component providing elastomeric properties and being selected from the group consisting of ethylene propylene copolymer, polybutylene, polyisobutylene, ethylene propylene diene monomer terpolymer, styrene butadiene styrene copolymer, styrene ethylene butylene styrene copolymer, styrene isoprene styrene copolymer, polybutene-1, and isobutylene isoprene copolymer.

41. A multiple layer film as in claim 33, said second component in said third layer comprising 10% to 30% by weight of the overall composition of said third layer, and including, in the composition of said third layer, up to 20% of a third component providing elastomeric properties and being selected from the group consisting of ethylene propylene copolymer, polybutylene, polyisobutylene, ethylene propylene diene monomer terpolymer, styrene butadiene styrene copolymer, styrene ethylene butylene styrene copolymer, styrene isoprene styrene copolymer, polybutene-1, and isobutylene isoprene copolymer.

42. A multiple layer film as in claim 34, said second component in said third layer comprising 10% to 30% by weight of the overall composition of said third layer, and including, in the composition of said third layer, up to 20% of a third component providing elastomeric properties and being selected from the group consisting of ethylene propylene copolymer, polybutylene, polyisobutylene, ethylene propylene diene monomer terpolymer, styrene butadiene styrene copolymer, styrene ethylene butylene styrene copolymer, styrene isoprene styrene copolymer, polybutene-1, and isobutylene isoprene copolymer.

43. A multiple layer film as in claim 35, said second component in said third layer comprising 10% to 30% by weight of the overall composition of said third layer, and including, in the composition of said third layer, up to 20% of a third component providing elastomeric properties and being selected from the group consisting of ethylene propylene copolymer, polybutylene, polyisobutylene, ethylene propylene diene monomer terpolymer, styrene butadiene styrene copolymer, styrene ethylene butylene styrene copolymer, styrene isoprene styrene copolymer, polybutene-1, and isobutylene isoprene copolymer.

44. A multiple layer film as in claim 36, said second component in said third layer comprising 10% to 30% by weight of the overall composition of said third layer, and including, in the composition of said third layer, up to 20% of a third component providing elastomeric properties and being selected from the group consisting of ethylene propylene copolymer, polybutylene, polyisobutylene, ethylene propylene diene monomer terpolymer, styrene butadiene styrene copolymer, styrene ethylene butylene styrene copolymer, styrene isoprene styrene copolymer, polybutene-1, and isobutylene isoprene copolymer.

45. A multiple layer film as in claim 37, said second component in said third layer comprising 10% to 30% by weight of the overall composition of said third layer, and including, in the composition of said third layer, up to 20% of a third component providing elastomeric properties and being selected from the group consisting of ethylene propylene copolymer, polybutylene, polyisobutylene, ethylene propylene diene monomer terpolymer, styrene butadiene styrene copolymer, styrene ethylene butylene styrene copolymer, styrene isoprene styrene copolymer, polybutene-1, and isobutylene isoprene copolymer.

46. A multiple layer film as in claim 38, said second component in said third layer comprising 10% to 30% by weight of the overall composition of said third layer, and including, in the composition of said third layer, up to 20% of a third component providing elastomeric properties and being selected from the group consisting of ethylene propylene copolymer, polybutylene, polyisobutylene, ethylene propylene diene monomer terpolymer, styrene butadiene styrene copolymer, styrene ethylene butylene styrene copolymer, styrene isoprene styrene copolymer, polybutene-1, and isobutylene isoprene copolymer.

47. A multiple layer film as in claim 39, said second component in said third layer comprising 10% to 30% by weight of the overall composition of said third layer, and including, in the composition of said third layer, up to 20% of a third component providing elastomeric properties and being selected from the group consisting of ethylene propylene copolymer, polybutylene, polyisobutylene, ethylene propylene diene monomer terpolymer, styrene butadiene styrene copolymer, styrene ethylene butylene styrene copolymer, styrene isoprene styrene copolymer, polybutene-1, and isobutylene isoprene copolymer.

48. A multiple layer film as in claim 40 wherein said third component in said third layer is styrene ethylene butylene styrene copolymer.

49. A multiple layer film as in claim 41 wherein said third component in said third layer is styrene ethylene butylene styrene copolymer.

50. A multiple layer film as in claim 42 wherein said third component in said third layer is styrene ethylene butylene styrene copolymer.

51. A multiple layer film as in claim 43 wherein said third component in said third layer is styrene ethylene butylene styrene copolymer.

52. A multiple layer film as in claim 44 wherein said third component in said third layer is styrene ethylene butylene styrene copolymer.

53. A multiple layer film as in claim 45 wherein said third component in said third layer is styrene ethylene butylene styrene copolymer.

54. A multiple layer film as in claim 46 wherein said third component in said third layer is styrene ethylene butylene styrene copolymer.

55. A multiple layer film as in claim 47 wherein said third component in said third layer is styrene ethylene butylene styrene copolymer.

56. A multiple layer film, comprising:
(a) a first layer, the composition of said first layer being a blend of (i), as a first component, 40% to 60% by weight of a first polypropylene, as a copolymer containing 5% to 7% ethylene, (ii) as a second component, 30% to 40% by weight of a first ethylene butene-1 copolymer containing 85 to 95 mole percent ethylene, and (iii), as a third component, 10% to 20% by weight of a styrene ethylene butylene styrene copolymer, said first layer comprising 50% to 70% of the thickness of said film;
(b) a second layer, the composition of said second layer being a blend of (i) 80% to 90% by weight of a second polypropylene containing about 3 to about 5 weight percent ethylene and (ii) 20% to 10% by weight of a second ethylene butene-1 copolymer containing 85 to 95 mole percent ethylene; said second layer comprising 20% to 40% of the thickness of said film; and
(c) a third layer, the composition of said third layer comprising a third polypropylene, as a copolymer containing 5 to 7 weight percent ethylene, said third layer comprising 5% to 15% of the thickness of said film,
said first layer being disposed between said second and third layers.

57. A multiple layer film as in claim 56 and including, in said third layer, a third ethylene butene-1 copolymer, containing 85 to 95 mole percent ethylene, in an amount up to 20% by weight.

58. A multiple layer film as in claim 56 wherein the composition of said third layer comprises 65% to 75% by weight of said third polypropylene, 10% to 20% by weight of a third ethylene butene-1 copolymer containing 85 to 95 mole percent ethylene, and 10% to 20% by weight styrene ethylene butylene styrene copolymer.

59. A multiple layer film as in claim 56 wherein the composition of said third layer comprises 55% to 65% by weight of said third polypropylene, 20% to 30% by weight of a third ethylene butene-1 copolymer containing 85 to 95 mole percent ethylene, and 10% to 20% by weight styrene ethylene butylene styrene copolymer.

60. A multiple layer film having at least three layers whose compositions comprise at least 40% polypropylene polymer, and wherein at least 15% of the thickness of said film comprises at least one of said polypropylene layers, and wherein said polypropylene in said at least 15% component comprises a random ethylene content at least 1 weight percent less than the combined random ethylene content of the polypropylene of the rest of said at least three layers.

61. A multiple layer film as in claim 60, said at least one layer being disposed toward a surface of said film.

62. A multiple layer film having a first layer disposed toward a first surface of said film, and comprising at least 40% by weight of a first polypropylene composition and a second layer disposed toward a second opposing surface of said film, and comprising at least 40% by weight of a second polypropylene composition, and wherein the melting point temperature of said second polypropylene composition is at least 3 degrees C. higher than the melting point temperature of said first polypropylene composition, said first polypropylene in said first layer comprising an ethylene content at least 1 weight percent greater than the ethylene content of said second polypropylene in said second layer.

63. A multiple layer film as in claim 61 wherein the melting point temperature of said second polypropylene composition is at least 5° C. higher than the melting point temperature of said first polypropylene composition.

64. A multiple layer film as in claim 62 or 63 wherein said second layer has not been subjected to molecular orientation in the solid state at a temperature between its glass transition temperature and its melting temperature.

65. A multiple layer film, comprising:
(a) a first layer comprising 20% to 70% of the thickness of said film, the composition of said first layer being a blend of (i) as a first component, a first polypropylene, as a copolymer containing 1 to 8 weight percent random moieties of ethylene, (ii) as a second component, 5% to 50% by weight of an ethylene butene-1 copolymer containing 85 to 95 mole percent ethylene, and a third component providing elastomeric properties and being selected from the group consisting of ethylene propylene copolymer, polybutylene, polyisobutylene, ethylene propylene diene monomer terpolymer, styrene butadiene styrene copolymer, styrene ethylene butylene styrene copolymer, styrene isoprene styrene copolymer, polybutene-1, and isobutylene isoprene copolymer;
(b) a second layer comprising 15% to 55% of the thickness of said film, the composition of said second layer being a blend of (i) a second polypropylene containing up to 7 weight percent random moieties of ethylene, (ii) as a second component, 5% to 50% by weight of an ethylene butene-1 copolymer containing 85 to 95 mole percent ethylene, and a third component providing elastomeric properties and being selected from the group consisting of ethylene propylene copolymer, polybutylene, polyisobutylene, ethylene propylene diene monomer terpolymer, styrene butadiene styrene copolymer, styrene ethylene butylene styrene copolymer, styrene isoprene styrene copolymer, polybutene-1, and isobutylene isoprene copolymer;
(c) a third layer comprising 5% to 20% of the thickness of said film, the composition of said third layer comprising a third polypropylene, as a copolymer containing 1 to 8 weight percent random moieties of ethylene, 0% to 30% by weight of an ethylene butene-1 copolymer, and styrene ethylene butylene styrene copolymer in a ratio with said ethylene butene-1 copolymer of up to about 0.8/1; and
(d) a fourth layer comprising 5% to 20% of the thickness of said film, the composition of said fourth layer comprising a fourth polypropylene, as a copolymer containing 0 to 7 weight percent random moieties of ethylene, and up to 25% by weight of an ethylene butene-1 copolymer,
said first layer being between said second and third layers, said second layer being between said first and fourth layers, the combination of said second and fourth layers overall comprising a polypropylene composition having a random ethylene content at least 1% lower than the overall random ethylene content of the combination of said first and third layers.

66. A multiple layer film as in claim 65 wherein said third component in each of said first and second layers is styrene ethylene butylene styrene copolymer.

67. A multiple layer film as in claim 66 wherein said first layer comprises 30%-70% of said first polypropylene polymer and 30%-40% of said first ethylene butene-1 copolymer, said second layer comprises 30%-70% of said second polypropylene and 30%-40% of said second ethylene butene-1 copolymer, said third polypropylene polymer in said third layer comprises 5-7 percent ethylene, and said fourth polypropylene polymer in said fourth layer comprises 3-4 percent ethylene.

68. A multiple layer film as in claim 66 wherein said first and third layers combined comprise 50%-80% of the thickness of said film and said second and fourth layers combined comprise 50%-20% of the thickness of said film.

69. A multiple layer film as in claim 67 wherein said first and third layers combined comprise 50%-80% of the thickness of said film and said second and fourth layers combined comprise 50%-20% of the thickness of said film.

70. A package made with a film of any one of claims 1-67.

71. A package as in claim 70, said package having been retort processed.

72. A package made with a film of any one of claims 1, 24, 56, 60, 61, or 63 wherein a layer of a lower melting polypropylene composition is disposed toward the interior of the package, and a layer of a relatively higher melting polypropylene is disposed toward the exterior of the package.

73. A multiple layer film, comprising:
(a) a first layer, the composition of said first layer comprising (i) as a first component, a first polypropylene as a copolymer containing 1 to 8 weight percent random moieties of ethylene and (ii) as a second component, a polymer providing elastomeric properties; and
(b) a second layer, the composition of said second layer comprising a second polypropylene containing up to 7 weight percent random moieties of ethylene, the random moiety ethylene content in said polypropylene in said second layer being at least 1 weight percent less than the random moiety ethylene content in said polypropylene in said first layer.

74. A multiple layer film as in claim 73 and including as a third component of said first layer, a second polymer providing elastomeric properties.

75. A multiple layer film as in claim 74 wherein said first elastomer in said first layer comprises an elastomeric ethylene butene-1 copolymer, and including, as a second component of said second layer, a polymer providing elastomeric properties.

76. A multiple layer film as in claim 73 wherein the melting point temperature of said second polypropylene polymer is at least 3 degrees C. higher than the melting point temperature of said first polypropylene polymer.

77. A multiple layer film as in claim 76 and including a third component in said first layer, said third component being selected from the group consisting of ethylene propylene copolymer, polybutylene, polyisobutylene, ethylene propylene diene monomer terpolymer, styrene butadiene styrene copolymer, styrene ethylene butylene styrene copolymer, styrene isoprene styrene copolymer, polybutene-1, and isobutylene isoprene copolymer.

78. A multiple layer film as in claim 75 wherein the melting point temperature of said second polypropylene polymer is at least 3 degrees C. higher than the melting point temperature of said first polypropylene polymer.

79. A multiple layer film as in claim 78 and including a third component in said second layer, said third component being selected from the group consisting of ethylene propylene copolymer, polybutylene, polyisobutylene, ethylene propylene diene monomer terpolymer, styrene butadiene styrene copolymer, styrene ethylene butylene styrene copolymer, styrene isoprene styrene copolymer, polybutene-1, and isobutylene isoprene copolymer.

80. A multiple layer film as in claim 73, said second layer being disposed toward a surface of said film.

81. A multiple layer sheet material having first and second layers disposed toward opposing surfaces of said sheet material, and whose compositions comprise at least 40% polypropylene, and wherein at least 15% of the thickness of said sheet material comprises at least one of said first and second layers, and wherein said polypropylene in said at least one layer comprises an ethylene content at least 1 weight percent less than the ethylene content of the polypropylene in the other of said first and second layers.

82. A multiple layer sheet material having at least two layers disposed toward opposing surfaces of said sheet material, and whose compositions comprise at least 40% polypropylene, and wherein at least 15% of the thickness of said sheet material comprises at least one of said polypropylene layers, and wherein said polypropylene in said at least 15% component has a melting point temperature at least 3 degrees C. higher than the melting point temperature of said polypropylene in those portions of said other two layers which are not encompassed by said at least 15% of the thickness of said sheet material.

* * * * *